(12) United States Patent
Kemppinen

(10) Patent No.: US 11,669,188 B2
(45) Date of Patent: Jun. 6, 2023

(54) OPERATING DEVICE FOR A VEHICLE

(71) Applicant: BEHR-HELLA THERMOCONTROL GMBH, Lippstadt (DE)

(72) Inventor: Pasi Kemppinen, Tampere (FI)

(73) Assignee: BEHR-HELLA THERMOCONTROL GMBH, Lippstadt (DE)

(*) Notice: Subject to any disclaimer, the term of this patent is extended or adjusted under 35 U.S.C. 154(b) by 0 days.

(21) Appl. No.: 17/284,575

(22) PCT Filed: Jul. 31, 2019

(86) PCT No.: PCT/EP2019/070595
§ 371 (c)(1),
(2) Date: Apr. 12, 2021

(87) PCT Pub. No.: WO2020/078600
PCT Pub. Date: Apr. 23, 2020

(65) Prior Publication Data
US 2022/0197462 A1    Jun. 23, 2022

(30) Foreign Application Priority Data
Oct. 17, 2018  (DE) .................. 10 2018 125 769.4

(51) Int. Cl.
*G06F 3/041* (2006.01)
*B60K 35/00* (2006.01)
(Continued)

(52) U.S. Cl.
CPC .......... *G06F 3/04142* (2019.05); *B60K 35/00* (2013.01); *G06F 3/016* (2013.01);
(Continued)

(58) Field of Classification Search
CPC .... G06F 3/04142; G06F 3/016; G06F 3/0412; G06F 2203/04105; B60K 35/00;
(Continued)

(56) References Cited

U.S. PATENT DOCUMENTS 10,106,101 B2    10/2018  Wachinger
2009/0243817 A1  10/2009  Son
(Continued)

FOREIGN PATENT DOCUMENTS

DE    10 2016 002 021 B3    7/2017
DE    10 2016 108 899 A1    11/2017
(Continued)

OTHER PUBLICATIONS

International Search Report issued in corresponding International Application No. PCT/EP2019/070595 dated Oct. 24, 2019, with English translation.

*Primary Examiner* — Adam R. Giesy
(74) *Attorney, Agent, or Firm* — BakerHostetler

(57) ABSTRACT

The operating device for a vehicle is provided with a housing having a front face with a receiving opening being delimited by an opening edge, and having a rear wall, and with an operating element being arranged in the receiving opening at a distance from the opening edge thereof and having an operating surface, said operating element having a front face provided with the operating surface, a rear face, and a delimiting edge region. The operating device further comprises a holding element having a bottom wall and support parts which protrude from the bottom wall and end below the delimiting edge region of the operating element and are mechanically coupled to the operating element in the delimiting edge region. The bottom wall of the holding element has a central region which is spaced from the support parts and within which the bottom wall of the holding element is supported against the rear wall of the housing. A manual actuation of the operating element is detected by multiple actuation sensors which are arranged between the bottom wall of the holding element and the rear wall of the housing within the surrounding region that surrounds the central region of the bottom wall of the
(Continued)

holding element and is arranged at a distance from the rear wall of the housing. An evaluation unit receives the signals from the actuation sensors and evaluates said signals for the purpose of detecting a manual actuation of the operating element performed with a predefinable minimum pressing force.

10 Claims, 4 Drawing Sheets

(51) Int. Cl.
*G06F 3/01* (2006.01)
*F21V 8/00* (2006.01)

(52) U.S. Cl.
CPC ...... *G06F 3/0412* (2013.01); *B60K 2370/143* (2019.05); *B60K 2370/152* (2019.05); *B60K 2370/158* (2019.05); *B60K 2370/16* (2019.05); *B60K 2370/33* (2019.05); *G02B 6/0051* (2013.01); *G06F 2203/04105* (2013.01)

(58) Field of Classification Search
CPC ........ B60K 2370/143; B60K 2370/152; B60K 2370/158; B60K 2370/16; B60K 2370/33; G02B 6/0051
See application file for complete search history.

(56) References Cited

U.S. PATENT DOCUMENTS

| | | |
|---|---|---|
| 2016/0195931 A1 | 7/2016 | Czelnik et al. |
| 2017/0329407 A1 | 11/2017 | Van Laack et al. |
| 2018/0275810 A1* | 9/2018 | Khoshkava ........... G06F 3/0488 |

FOREIGN PATENT DOCUMENTS

| | | |
|---|---|---|
| EP | 2 224 313 A1 | 9/2010 |
| EP | 3 379 386 A1 | 9/2018 |

* cited by examiner

OPERATING DEVICE FOR A VEHICLE

CROSS-REFERENCE TO RELATED APPLICATION

The present patent application is the U.S. National Phase under 35 U.S.C. § 371 of International Patent Application No. PCT/EP2019/070595, filed on Jul. 31, 2019, which in turn claims priority of the German Patent Application 10 2018 125 769.4 of Oct. 17, 2018, the content of which is hereby incorporated by reference into the subject matter of the present patent application.

TECHNICAL FIELD

The invention refers to an operating device for a vehicle, e.g., for a vehicle component such as an air-conditioning system, an infotainment system or a navigation system, and in general to a human-machine interface.

BACKGROUND

The application of displays in vehicles which at the same time are input elements in the form of touch surfaces is becoming increasingly popular. Said touch displays, which are already actuated by a slight touch, may be accidentally actuated. If this activates safety-relevant functions or causes other unintended adjustments of a vehicle function, this can be problematic. In such cases, an additional sensing system is required to detect or determine the force with which the operator presses on the corresponding area in the operating field. In this way, a substantial activation by a slight touch is avoided. Since a rigid operating surface is often demanded, substantially force-sensitive resistors, strain gauges, optical or capacitive sensors are used as a sensing system. The sensors usually measure a distance covered by the operating surface relative to a rigid part of the component via the deflection of a spring element. For this purpose, the display surface is usually movably mounted in the housing.

From DE-B-10 2016 002 021, DE-A-10 2016 108 899 and EP-A-2 224 313 operating devices with resiliently mounted operating elements are known.

The above-described principles require a complex mechanism which allows for a movement of the display relative to a rigid housing part. In addition, one or more spring elements are required, which makes the overall system more expansive.

SUMMARY

An object of the invention is to provide an operating device for a vehicle, the construction of which is simplified for measuring the release force during manual actuation of the display.

For achieving this object, the invention suggests an operating device for a vehicle being provided with
- a housing having a front face with a receiving opening being delimited by an opening edge, and having a rear wall,
- an operating element being arranged in the receiving opening at a distance from the opening edge of the receiving opening and having an operating surface, said operating element having a front face provided with the operating surface, a rear face, and a delimiting edge region,
- a holding element having a bottom wall and support parts that protrude from the bottom wall and end below the delimiting edge region of the operating element and are mechanically coupled to the operating element in the delimiting edge region of the operating element,
- wherein the bottom wall of the holding element has a central region which is spaced from the support parts and within which the bottom wall of the holding element is supported against the rear wall of the housing,
- a plurality of actuation sensors for detecting a manual actuation of the operating element, wherein the plurality of actuation sensors are arranged between the bottom wall of the holding element and the rear wall of the housing within the surrounding region that surrounds the central region of the bottom wall of the holding element, and are arranged at a distance from the rear wall of the housing, and detect bending moments which, upon manual actuation of the operating element, act on the holding element within the surrounding region of the holding element that surrounds the central region, and
- an evaluation unit receiving signals from the actuation sensors and evaluating said signals for the purpose of detecting a manual actuation of the operating element performed with a predefined minimum pressing force.

It is correspondingly suggested with the invention to use the holding element supporting the operating element for the transmission of the pressing force to corresponding actuation sensors which sense with which pressing force the operating surface of the operating element is actuated.

The holding element is substantially configured as a trough-shaped or well-shaped element comprising a bottom wall from which support parts protrude at preferably all edge sections. In particular, the bottom wall comprises a circumferential protruding peripheral wall which expediently merges into a likewise circumferential flange. In this variant of the invention, the support parts are then configured as those side wall sections that protrude from the bottom wall along each edge section of the bottom wall. However, it is also conceivable that individual support parts which are separated from one another and are thus spaced apart protrude from the bottom wall at preferably all edge sections.

The support parts a coupled to the operating element in a delimiting edge region of the operating element. The operating element itself has an operating surface forming the front face, a rear face and the aforementioned circumferential delimiting edge region.

The holding element itself is located in the housing of the operating device comprising a front face with a receiving opening which is delimited by an opening edge and within which the operating element is arranged. The housing further comprises a rear wall. Finally, the housing also comprises side walls.

A peculiarity of the operating device according to the invention is that the holding element is rigidly connected to the rear wall of the housing in a central region of its bottom wall. Thus, the rear wall supports the holding element in said central region of the bottom wall. Outside of the central region, i.e., in the surrounding region of the central region of the bottom wall, the holding element is spaced from the rear wall of the housing; a ring gap is formed between the holding element and the rear wall.

If now the operating surface of the operating element is manually actuated, the holding element and in particular its bottom wall experiences a bending moment. Since the force which is used to manually press against the operating surface of the operating element is transferred to the bottom wall via the delimiting edge region of the operating element and the support parts which are mechanically coupled to said delimiting edge region. Since the bottom wall is centrally mounted and apart from that has a gap to the rear wall of the housing, the bottom wall can now deform as a cantilevered bending beam and receive respective bending moments. Said bending moments are transmitted to actuation sensors which are located between the surrounding region around the central region of the bottom wall and the rear wall of the housing. The actuation sensors can be configured as position sensors and/or force sensors and/or pressure sensors. MEMS components (microelectro-mechanical sensors) are particularly suitable. The measurement signals of the actuation sensors are transmitted to an evaluation unit which comprises, inter alia, a microprocessor with a corresponding hardware architecture. The measurement signals of the actuation sensors are evaluated in the evaluation unit for the purpose of recognizing a valid manual actuation, i.e., an actuation of the operating element performed with a predefined minimum pressing force. Thus, faulty operations of the operating element can be excluded.

The operating device according to the invention is characterized by a compact design. The shear connection of the holding element with the rear wall of the housing allows to provide an actuator between the holding element and operating element for an optionally desired haptic feedback of the operating device. In this case, the actuator would, on the one hand, be supported by the holding element in order to mechanically stimulate the operating element in a pulse-like manner, for example for the purpose of lateral pulse-like movement of the operating element, which is manually detectable by tactile means and thus provides tactile feedback of a valid actuation of the operating element.

In a further advantageous configuration of the invention it is provided that the evaluation unit also evaluates the signals of the actuation sensors for the purpose of recognizing the position on the operating surface of the operating element on which the manual actuation of the operating element is performed.

Alternatively or additionally, the operating element can be provided with a touch sensing system for recognizing the position on the operating surface of the operating element on which the manual actuation of the operating element is performed. The touch sensing system can work in a capacitive, resistive or optical manner. If MEMS are used, the bending moment to which the bottom wall of the holding element is subjected during manual actuation of the operating surface of the operating element can be transferred to bending beams, bending membranes or the like, wherein the mechanical bending of said micro-mechanical elements of the MEMS is detected by transistor or resistance measurement bridges or other micro-mechanical, micro-electrical components.

In a further expedient configuration of the invention, the support parts and the delimiting edge region of the operating element can be rigidly connected to each other.

As already mentioned above, the operating device according to the invention can also be provided with a haptic feedback function. In general, this involves mechanically stimulating the operating surface when a valid actuation has been detected. For this purpose, the operating element together with the holding element would have to be elastically connected. In the concept of the shear connection of the holding element of the operating element to the rear wall of the housing presented in the context of this invention, the operating element, which for this purpose must be elastically and thus resiliently connected to the supporting parts of the holding element, then remains for mechanical excitation for the haptic feedback function.

In this respect, a variant of the invention suggests that the support parts and the delimiting edge region of the operating element are mechanically coupled to each other by a resilient connection element disposed therebetween.

It is particularly advantageous if the connection element is resilient after compression perpendicular to the operating surface of the operating element and is resiliently displaceable when the operating element is displaced orthogonally thereto. Elastomeric material such as rubber or silicon is suitable as a material for the connection element. The connection element is expediently designed as a strip material which preferably extends along the entire delimiting edge region and mechanically couples the delimiting edge region to the support parts of the holding element. Due to the geometric shape of the strip material, its elasticity perpendicular to the operating surface and transverse thereto can be influenced within certain limits. It is also possible to use composite material, i.e., elastomeric material and rigid bodies embedded into said elastomeric material which greatly reduce or completely eliminate the compressibility perpendicular to the operating surface, but nonetheless continue to ensure the displaceability of the connection element transverse to the operating surface.

With the previously described concept of the elastic connection of the operating element to the holding element, it is now possible to arrange an actuator for haptic feedback between the holding element and the operating element, wherein the actuator is supported on the holding element (and thus via the holding element on the housing) and mechanically stimulates the operating element with its actuator element. A suitable actuator is, for example, an electro-mechanic actuator such as a tie rod or a piezo actuator (with or without amplification gear).

In a further advantageous configuration of the invention it may be provided that the operating element comprises a display with a front face that displays information and forms the operating surface of the operating element. Here, the display can comprise cover pane defining the operating surface with a display unit for optical display of information being arranged behind the cover pane. In such a configuration of the operating element with display, the cover pane expediently protrudes over the display unit on all sides, said protruding area forming the delimiting edge region of the operating element.

The displays which are predominantly used in operating devices today work with LCD technology. For the purpose of improved visualization of the displayed information, such displays are provided with backlight units. The holding element which supports the operating element in the operating device according to the invention can now expediently be used to receive such a backlight unit. However, alternatively displays are also used in which the individual pixels light up automatically when they are needed to display information. Unlike LCD technology, the display is not designed as a kind of shutter but is provided with individual pixels that can be actively controlled for illumination. An example for such a display is an OLED display, for example. Displays that can be actively controlled to illuminate individual pixels no longer need a backlight unit. In such displays, the holding element fulfills the function of a mechanical protection of the rear face of the display, said function is also fulfilled by the holding element besides if the display comprises a backlight unit received by the holding element. In both cases, the holding element covers the rear face of the display more or less.

The concept according to the invention to use the holding element for the transfer of moments acting on the operating element upon manual actuation is the same in all cases.

BRIEF DESCRIPTION OF THE DRAWINGS

In the following, the invention is described in more detail by means of an exemplary embodiment with reference to the drawing, in which.

DETAILED DESCRIPTION

Figure 1:
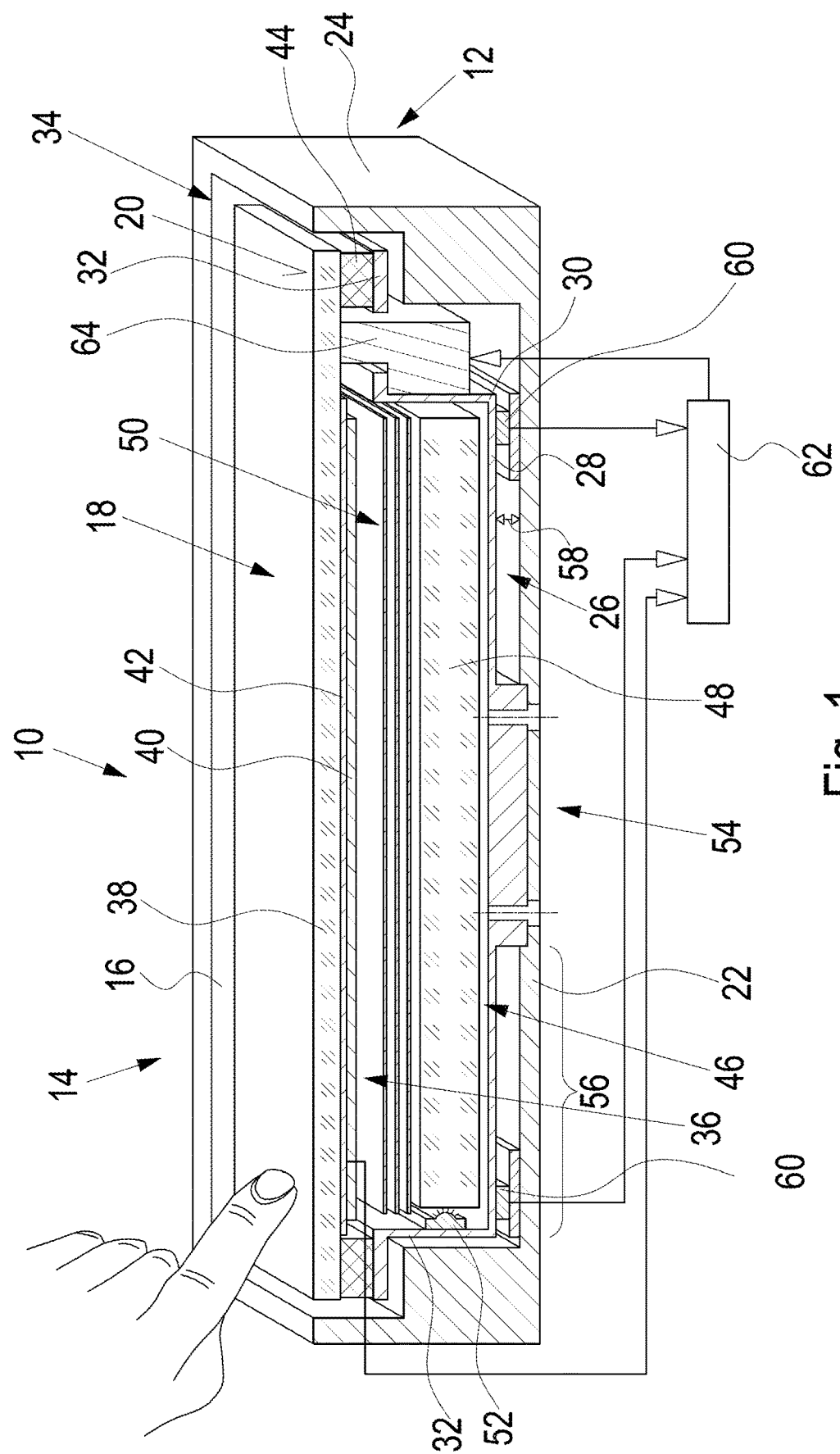
FIG. 1 shows a sectional view through the structure of an operating device according to an exemplary embodiment of the invention.

FIG. 1 schematically shows the basic structure of an operating device 10 according to an exemplary embodiment of the invention. The operating device 10 comprises a housing 12 with a receiving opening 16 on its front face 14 within which an operating element 18 with an operating surface 20 is arranged. The housing further comprises a rear wall 22 being connected via side walls 24 to front face 14 of housing 12.

A holding element 26, which is well-shaped in this exemplary embodiment, is disposed within housing 12, the holding element 26 comprising a bottom wall 28 from which protruding support parts 30 protrude upward on all sides of bottom wall 28, the support parts 30 merging into an outwardly facing mounting flange 32. The mounting flange 32 is mechanically coupled to the circumferential delimiting edge region 34 of operating element 18.

In this exemplary embodiment, operating element 18 is configured as display 36. The display 36 comprises a cover pane 38 the front face of which forms operating surface 20 of operating element 18. The display unit 40 (e.g., realized in LCD technology) is disposed behind cover pane 38. In addition, display 36 can also comprise a touch sensing system in the form of a touch panel 42. Such displays are generally known in prior art and will not be described further here.

In the delimiting edge region 34 of cover pane 38 the latter is resiliently connected to mounting flange 32. This is accomplished by a connection element 44 which in this exemplary embodiment has the form of an elastomeric band extending along mounting flange 32. For example, the connecting element is bonded to mounting flange 32 and to cover pane 38 in a shear manner.

A backlight unit 46 for backlighting display 36 is disposed within the well-shaped holding element 26, the backlight unit 46 having an optical waveguide element 48 and a diffusor 50 for homogenization of the light emitted by the light guiding element 48 towards display 36. In this exemplary embodiment, the optical waveguide element 48 is fed with light by LEDs arranged as light sources 52 at the inner side of the support elements. This technology is also basically known and will not be explained further here.

Figure 2:
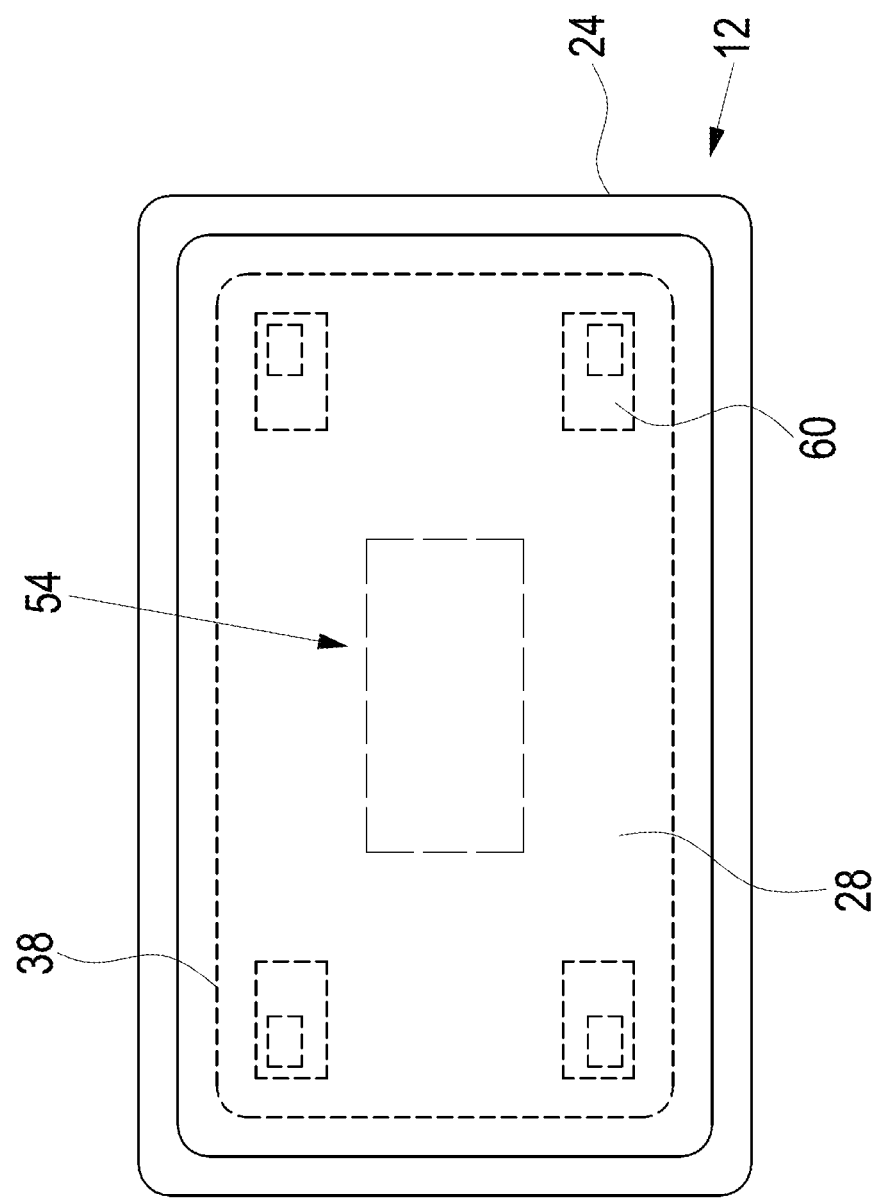
FIG. 2 shows a plan view of the operating device.

A peculiarity of operating device 10 according to FIG. 1 can be seen in the rigid connection of holding element 26 to rear wall 22 of housing 12. This is shown in FIG. 1. Here, a central region 54 of bottom wall 28 is connected to rear wall 22 of housing 12. The surrounding region 56 of bottom wall 28, which extends about the central region 54 on all sides, is arranged at a distance from rear wall 22 of housing 12 (see gap space 58). In this intermediate space, actuation sensors 60 are preferably located in the corner regions of bottom wall 28, as indicated in FIG. 2.

The actuation sensors 60 deliver their measurement signals to an evaluation unit 62 which also receives information from the touch sensing system (touch panel 42) of display 36. The signals of the actuation sensors 60 are now analyzed in the evaluation unit 62 in order to decide whether upon manual actuation of operating surface 20 a minimum pressing force was applied on operating surface 20 which is decisive for a valid actuation of operating surface 20.

Furthermore, operating device 10 is provided with a haptic feedback function. For this purpose, the operating device 10 comprises an actuator 64 being configured as an electro-magnetic actuator element or also as a piezo actuator. An object of actuator 64 is to laterally excite operating element 18 in a mechanical pulse-like manner upon detection of a valid actuation of operating element 18. For this purpose, the elastic connection element 44 is used, inter alia, which, on the one hand, allows for a force or moment transmission from operating element 18 via holding element 26 to the actuation sensors 60 and, on the other hand, also allows for a laterally acting shearing.

Figure 3:
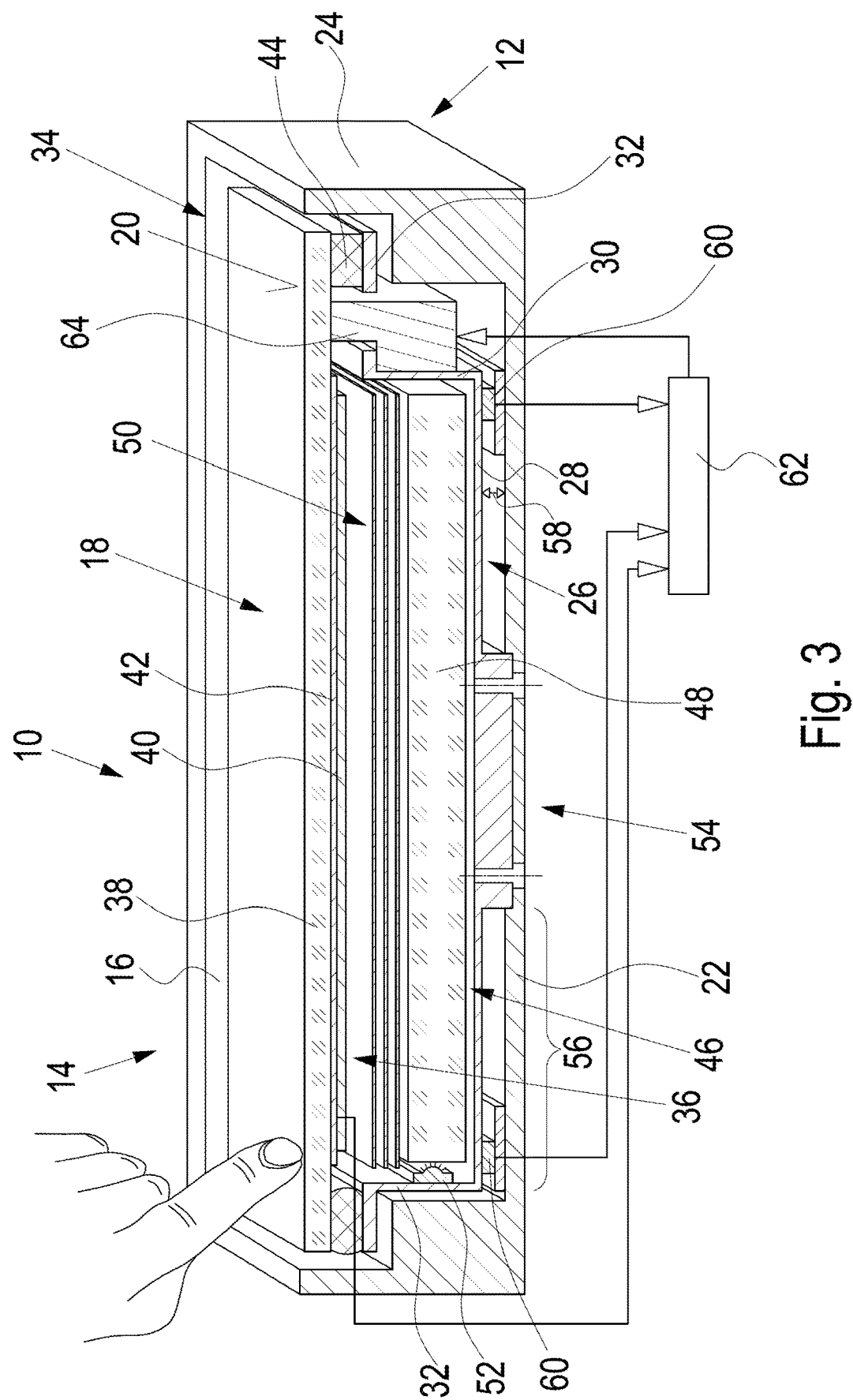
FIG. 3 shows the situation in which pressure is applied with a finger of a hand on the operating surface of the operating element of the operating device.
Figure 4:
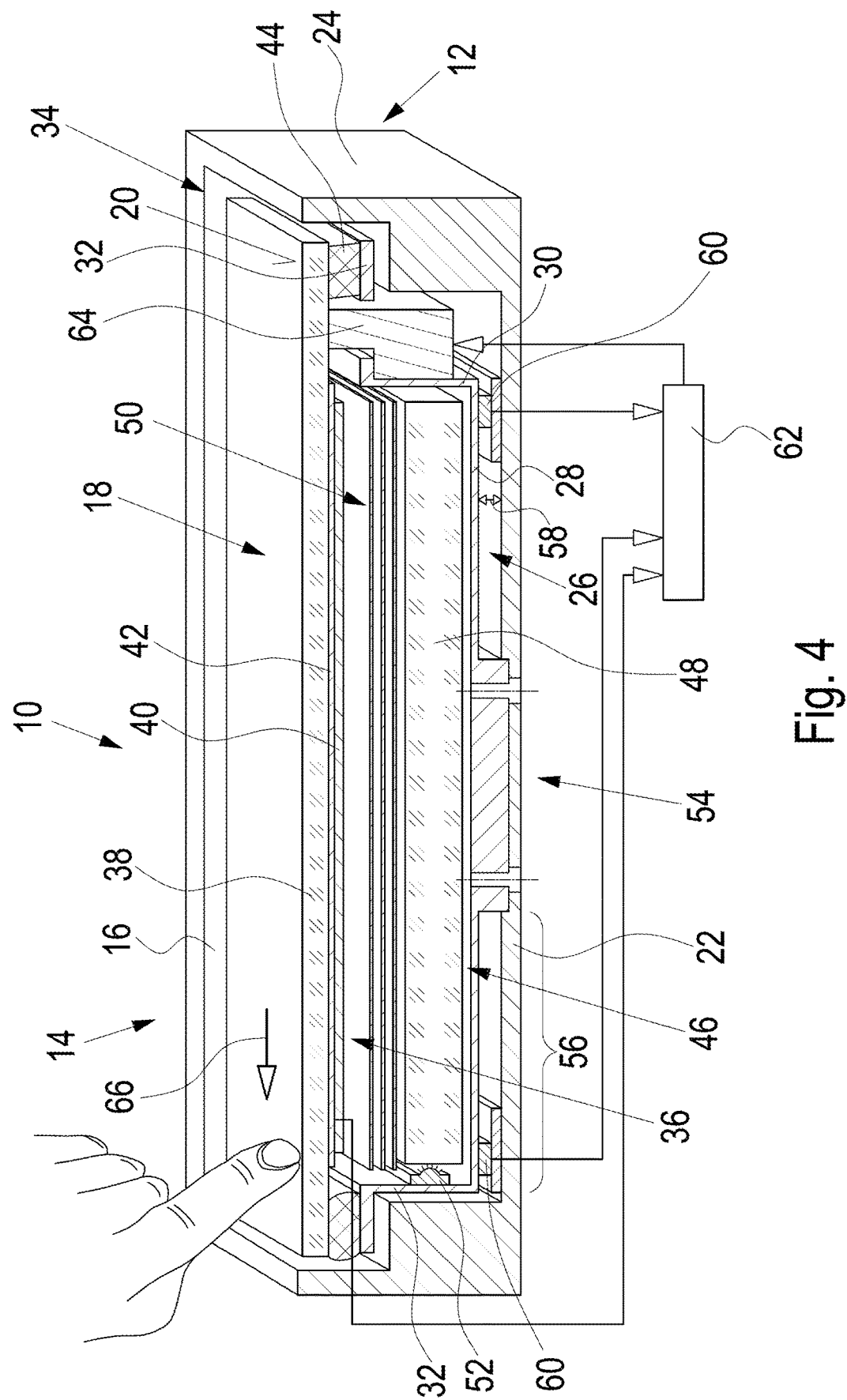
FIG. 4 shows the situation in which, as a result of a valid actuation of the operating surface of the operating element, the operating element is laterally excited in a mechanical pulse-like manner.

This is shown in FIGS. 3 and 4. FIG. 3 shows the situation in the moment of manual actuation of operating surface 20 with a minimum pressing force required for a valid actuation. The actuation sensors 60 sense a pressing force. If the pressing force is larger than the minimum pressing force, evaluation unit 62 outputs a control signal to actuator 64 which laterally excites operating element 18 in a mechanical pulse-like manner, which is indicated in FIG. 4 by arrow 66.

FIG. 3 shows that in case of a decentralized manual pressure application on operating surface 20, the actuation sensors 60 opposite the touch point of operating surface 20 (i.e. the one or the two touch sensors 60 shown on the right side in FIG. 3) are still in contact with holding element 26. This may be useful if pressure or force sensors are used as actuation sensors 60. If position sensors are used as actuation sensors 60, a distance between said sensors and holding element 26 (when the sensors are arranged on rear wall 22 of housing 12) or between said sensors and rear wall 22 (when said sensors are arranged on the lower side of holding element 26) can occur or can exist in the resting state of operating element 18, respectively.

The actuation sensors 60 can be used, in addition to detecting whether the predefined minimum pressing force has been applied when operating surface 20 is touched, to detect the location at which operating element 18 has been manually acted upon. The force with which manual pressure is applied against operating surface 20 acts as measurement signals of different sizes of the plurality of actuation sensors 60, depending on the location at which operating surface 20 is acted upon. Through prior appropriate calibration, the location of manual actuation of operating surface 20 can then be inferred depending on the measurement signal pattern.

LIST OF REFERENCE NUMERALS 10 operating device
12 housing 14 front face of housing
16 receiving opening in front face
18 operating element
20 operating surface of housing
22 rear wall of housing
24 side walls of housing
26 holding element
28 bottom wall of holding element
30 support parts of holding element
32 mounting flange of support parts
34 delimiting edge region of operating element
36 display
38 cover pane of display
40 display unit of display
42 touch panel of display
44 connection element
46 backlight unit of display
48 optical waveguide element of backlight unit
50 diffusor of backlight unit
52 light sources of backlight unit
54 central region of bottom wall
56 surrounding region about central region
60 actuation sensors
62 evaluation unit
64 actuator
66 arrow

The invention claimed is:

1. An operating device for a vehicle, comprising
a housing having a front face with a receiving opening being delimited by an opening edge, and having a rear wall;
an operating element being arranged in the receiving opening at a distance from the opening edge thereof and having an operating surface, said operating element having a front face provided with the operating surface, a rear face, and a delimiting edge region;
a holding element having a bottom wall and support parts which protrude from the bottom wall and end below the delimiting edge region of the operating element and are mechanically coupled to the operating element in the delimiting edge region,
wherein the bottom wall of the holding element has a central region which is spaced from the support parts and a surrounding region surrounding the central region, wherein the central region of the bottom wall is supported against the rear wall of the housing, and wherein the surrounding region of the bottom wall is arranged at a distance from the rear wall of the housing;
a plurality of actuation sensors for detecting a manual actuation of the operating element, wherein the plurality of actuation sensors is arranged between the surrounding region of the bottom wall of the holding element and the rear wall of the housing, wherein the actuating sensors detect bending moments which, upon manual actuation of the operating element, act on the holding element within the surrounding region of the holding element that surrounds the central region; and
an evaluation unit receiving signals from the actuation sensors and evaluating said signals for the purpose of detecting a manual actuation of the operating element performed with a predefined minimum pressing force,
wherein the operating element comprises a display with a front side displaying information,
wherein the display comprises a cover pane defining the operating surface and a display unit for optical display of information being arranged behind the cover pane,
wherein the cover pane laterally protrudes from the display unit on all sides, wherein a protruding area of the cover pane forms the delimiting edge region of the operating element and is mechanically coupled to the support parts of the holding element, and
wherein the holding element receives a backlight unit for backlighting the display unit.

2. The operating device according to claim 1, wherein the evaluation unit further evaluates the signals of the actuation sensors for the purpose of recognizing the position on the operating surface of the operating element on which the manual actuation of the operating element is performed.

3. The operating device according to claim 1, wherein the operating element is provided with a touch sensing system for recognizing the position on the operating surface of the operating element on which the manual actuation of the operating element is performed.

4. The operating device according to claim 3, wherein the touch sensing system works in a capacitive, resistive or optical manner.

5. The operating device according to claim 1, wherein the support parts and the delimiting edge region of the operating element are rigidly connected to each other.

6. The operating device according to claim 1, wherein the support parts and the delimiting edge region of the operating element are mechanically coupled to each other by means of a resilient connection element arranged therebetween.

7. The operating device according to claim 6, wherein the connection element is resilient after compression perpendicular to the operating surface of the operating element and is resiliently displaceable when the operating element is displaced orthogonally to such a compression perpendicular to the operating surface.

8. The operating device according to claim 7, further comprising
an actuator controllable by the evaluation unit for generating a tactile feedback when the operating element is actuated with the predefined minimum pressing force by mechanical action on the operating element.

9. The operating device according to claim 6, further comprising
an actuator controllable by the evaluation unit for generating a tactile feedback when the operating element is actuated with the predefined minimum pressing force by mechanical action on the operating element.

10. The operating device according to claim 1, wherein the actuation sensors comprise position sensors and/or force sensors and/or pressure sensors.

* * * * *